United States Patent
Merfels et al.

(10) Patent No.: US 11,222,543 B2
(45) Date of Patent: Jan. 11, 2022

(54) METHOD FOR DETERMINING TRAFFIC INFORMATION

(71) Applicants: Volkswagen Aktiengesellschaft, Wolfsburg (DE); AUDI AG, Ingolstadt (DE)

(72) Inventors: Christian Merfels, Braunschweig (DE); Constanze Hungar, Braunschweig (DE); Bernd Rech, Bokensdorf (DE); Thilo Schaper, Lehrte (DE); Daniel Wilbers, Wolfsburg (DE); Niklas Koch, Wolfsburg (DE); Florian Haubner, Willanzheim (DE); Simon Seitle, Karlshuld (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/046,075

(22) PCT Filed: Apr. 11, 2019

(86) PCT No.: PCT/EP2019/059339
§ 371 (c)(1),
(2) Date: Oct. 8, 2020

(87) PCT Pub. No.: WO2019/197573
PCT Pub. Date: Oct. 17, 2019

(65) Prior Publication Data
US 2021/0035449 A1 Feb. 4, 2021

(30) Foreign Application Priority Data
Apr. 11, 2018 (DE) ..................... 10 2018 108 538.9

(51) Int. Cl.
*G08G 1/00* (2006.01)
*G08G 1/01* (2006.01)

(52) U.S. Cl.
CPC ............. *G08G 1/20* (2013.01); *G08G 1/0104* (2013.01)

(58) Field of Classification Search
CPC .......... G08G 1/20; G08G 1/0104; G08G 1/00; G08G 1/01; G08G 1/014; G08G 1/017
See application file for complete search history.

(56) References Cited

U.S. PATENT DOCUMENTS

| 7,672,774 | B2 * | 3/2010 | Glaza ................... G08G 1/0104 701/117 |
| 8,082,096 | B2 * | 12/2011 | Dupray ................ G01S 5/0252 701/465 |

(Continued)

FOREIGN PATENT DOCUMENTS

| DE | 10030932 A1 | 1/2002 | ............. G01C 21/26 |
| DE | 102016008895 A1 | 1/2018 | ............... G07C 5/08 |

(Continued)

OTHER PUBLICATIONS

Dabeer, Onkar et al., "An End-to-End System for Crowdsourced 3D Maps for Autonomous Vehicles: The Mapping Component," 2017 IEEE/RSJ International Conference on Intelligent Robots and Systems (IROS), pp. 634-641, Sep. 24, 2017.

(Continued)

*Primary Examiner* — Hoi C Lau
(74) *Attorney, Agent, or Firm* — Slayden Grubert Beard PLLC

(57) ABSTRACT

The invention relates to a method for determining traffic information with the aid of a central monitoring device which is in communication with a plurality of fleet vehicles in order to obtain traffic information from the fleet vehicles, wherein within communication with the fleet vehicles the (Continued)

monitoring device transmits targeted measurement requests to the fleet vehicles. In one exemplary aspect, the invention proposes that during the transmission of targeted measurement requests, the monitoring device takes account of the quality of sensors with which the individual fleet vehicle are equipped.

19 Claims, 1 Drawing Sheet

(56) References Cited

U.S. PATENT DOCUMENTS

| | | | | |
|---|---|---|---|---|
| 2003/0182051 | A1* | 9/2003 | Yamamoto | G08G 1/01 701/532 |
| 2006/0291633 | A1* | 12/2006 | Glaza | G08G 1/0104 379/112.02 |
| 2008/0133126 | A1* | 6/2008 | Dupray | G08G 1/096811 701/408 |
| 2013/0238648 | A1* | 9/2013 | Fujiwara | G01C 21/32 707/758 |
| 2016/0027055 | A1* | 1/2016 | Dixon | H04L 67/306 705/14.58 |
| 2016/0078758 | A1* | 3/2016 | Basalamah | G08G 1/0141 701/118 |
| 2018/0082586 | A1* | 3/2018 | Sengupta | G06F 3/00 |
| 2018/0268168 | A1* | 9/2018 | Herlocker | G06F 16/29 |
| 2018/0299285 | A1* | 10/2018 | Morita | G08G 1/096811 |
| 2019/0012909 | A1* | 1/2019 | Mintz | G08G 1/017 |
| 2019/0185007 | A1* | 6/2019 | Mielenz | B60W 40/04 |
| 2019/0266190 | A1 | 8/2019 | Naffati | |
| 2019/0278297 | A1* | 9/2019 | Averhart | G01C 21/3697 |
| 2020/0262451 | A1* | 8/2020 | Zaum | G05D 1/0088 |
| 2020/0271455 | A1* | 8/2020 | Mielenz | G01C 21/30 |

FOREIGN PATENT DOCUMENTS

| | | | | |
|---|---|---|---|---|
| DE | 102016217081 A1 * | 3/2018 | | H04L 67/12 |
| DE | 102016217081 A1 | 3/2018 | | G01S 13/93 |
| DE | 102018108538 A1 | 10/2019 | | G08G 1/00 |
| WO | 2019/197573 A1 | 10/2019 | | G06F 9/50 |

OTHER PUBLICATIONS

International Search Report and Written Opinion, Application No. PCT/EP2019/059339, 7 pages.
German Office Action, Application No. 102018108538.9, 6 pages, dated Oct. 30, 2018.
International Preliminary Report on Patentability, Application No. PCT/EP2019/059339, 6 pages, dated Jul. 3, 2019.

* cited by examiner

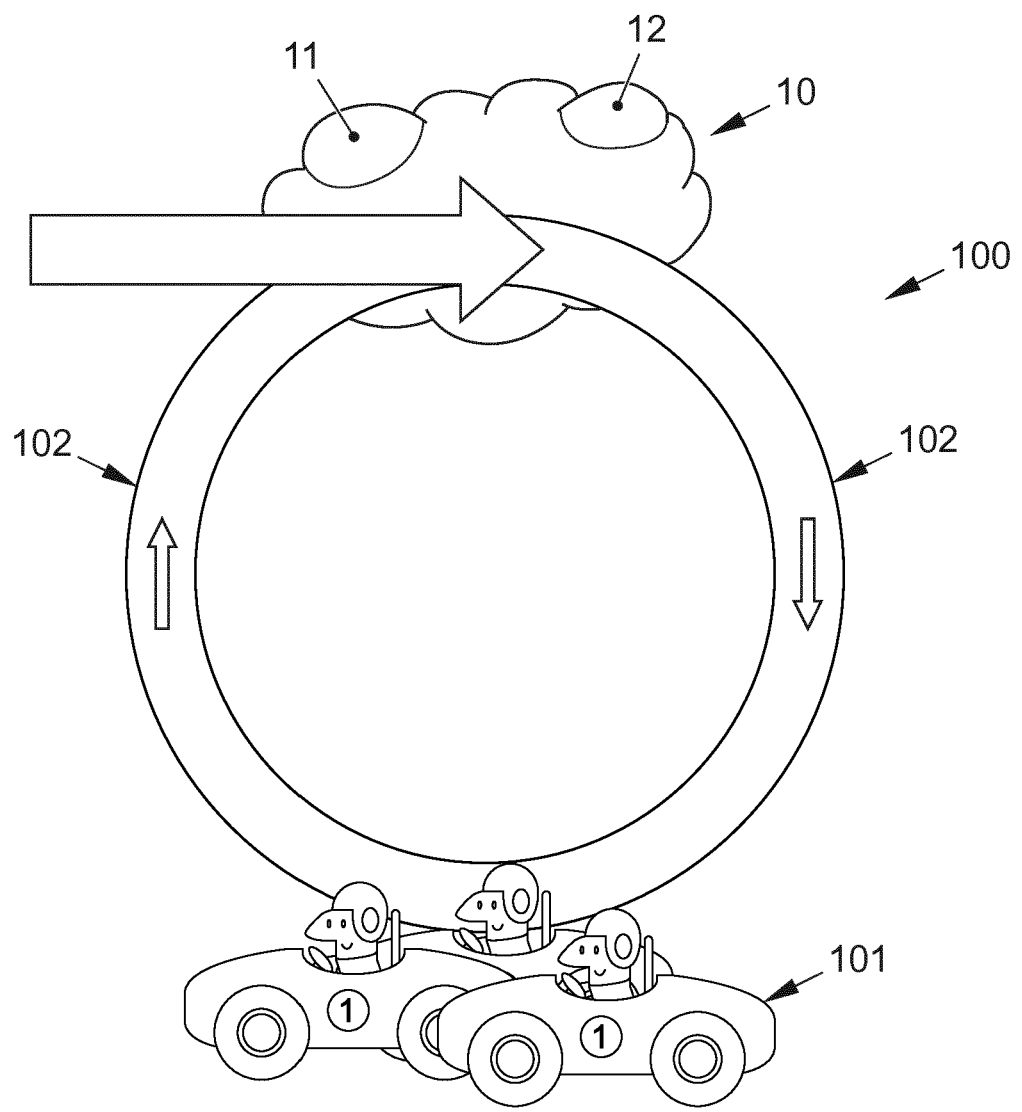

METHOD FOR DETERMINING TRAFFIC INFORMATION

CROSS-REFERENCE TO RELATED APPLICATIONS

This application claims priority to German Patent Application No. DE 10 2018 108 538.9, filed on Apr. 11, 2018 with the German Patent and Trademark Office. The contents of the aforesaid Patent Application are incorporated herein for all purposes.

TECHNICAL FIELD

The invention relates to a method for determining traffic information according to the preamble of the independent method claim. The invention also relates to a corresponding system for determining traffic information.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the future, maps comprising detailed traffic information will form the basis for many driver assistance functions and automated driving functions. These maps are currently kept up-to-date by a fleet of vehicles that provide messages to a central monitoring device, a so-called backend device. Currently, the messages may contain information about changed map elements. The maps that have been updated on the monitoring device are then redistributed to the fleet vehicles. It is currently assumed that the vehicle fleet sufficiently covers all map areas so that all areas can be kept up to date. In reality, however, this is not the case since only few fleet vehicles comprise the necessary sensors and/or computing power for calculating update messages and send them to the monitoring device.

SUMMARY

An object thus exists to at least partially overcome at least one disadvantage known from the prior art during determining traffic information. In particular, it is an object to provide a method for determining traffic information, which provides improved traffic information and covers different map sections as completely and uniformly as possible and with a high data quality.

The object is solved by a method for determining traffic information comprising the features of the independent method claim, and by a corresponding system comprising the features of the independent device claim.

Some embodiments are specified in the dependent claims and the following description. Features that are disclosed with regard to individual exemplary aspects can be combined with one another in such a way that regarding to the disclosure of the aspects mutual reference is or can always be made.

The details of one or more embodiments are set forth in the accompanying drawings and the description below. Other features will be apparent from the description, drawings, and from the claims.

BRIEF DESCRIPTION OF THE DRAWINGS

The single FIGURE shows a schematic representation of a system for determining traffic information.

DESCRIPTION

In one exemplary aspect, a method is provided for determining traffic information, which is carried out with the aid of a central monitoring device, a so-called backend device, which is in communication with a large number of fleet vehicles in order to receive traffic information from the fleet vehicles, wherein within the communication with the fleet vehicles the monitoring device transmits targeted measurement requests (to update certain map sections) to the fleet vehicles. For this purpose, it is provided that the monitoring device takes into account the quality of sensors when transmitting targeted measurement requests with which the individual fleet vehicles are equipped.

The traffic information according to the present aspect may include information of any kind that may relate to a geographical map, including, for example: route, number, width and geometric configuration of lanes, inclination or gradient of the road, presence of traffic lights, traffic light switching, presence of intersections, presence of roundabouts, art of roads: country roads, autobahns, urban areas, quality and frequentation of roads, traffic markings, traffic signs, speed limits, current construction work, fences, diversions, etc.

One basic idea lies in the fact that the determination of traffic information may be significantly improved by the targeted influencing of measurement requests by selecting the appropriate sensors of the fleet vehicles. The information arising from unsuitable sensors may provide a certain uncertainty, inaccuracy, errors or no results at all. Since the vehicles nowadays have a large number of different brands and models and different equipment, not every vehicle may deliver certain traffic information with the same quality. Querying vehicles with unsuitable sensors would therefore be a waste of the available resources.

First of all, it is conceivable that the monitoring device may generate targeted measurement requests that relate to the information about which routes or map sections are to be updated. For this purpose, the monitoring device may take into account certain criteria for the quality of the map sections that are already recorded in the map, such as the age, the accuracy or the uncertainty of the map sections. Furthermore, when creating the measurement requests, the monitoring device may take into account historical data which provide information on areas or lanes that are rarely used. If routes are identified within these areas for which updates are of interest, these may be given a special weighting. The measurement requests for determining the necessary updates in certain map areas may be created regularly, for example periodically, automatically or semi-automatically by the monitoring device. Alternatively, certain measurement requests may be taken into account that are set manually, for example by monitoring staff, or that come from the fleet vehicles.

The measurement requests are therefore map elements to be updated, i.e., georeferenced data that the monitoring device may communicate to the fleet vehicles in various formats. On the one hand, it is possible that the fleet vehicles receive the measurement requests as a dynamic map layer, or they may explicitly call up the measurement requests from the central monitoring device. Likewise, with known vehicle routes (for example with online routing or with known, learned typical personal routes, such as for the way to the working place), specific alternative route suggestions may be given by taking into account the map elements to be updated.

According to the present aspect, the selection of the individual fleet vehicle may be made dependent on the sensor system installed in the specific fleet vehicle, including its measuring accuracy or visibility. For example, the extent to which the vehicle sensors may be influenced, such as the focusing of a camera on certain elements, is relevant.

The monitoring device may, e.g., specifically express the measurement requests. If the monitoring device knows the routes of fleet vehicles, for example due to the use of an online route planner, a targeted measurement request may be sent directly to these fleet vehicles. This could be particularly relevant for automatic fleet vehicles. The monitoring device could then specifically influence the route of the fleet vehicles, among other things by using parallel lanes. If, on the other hand, the route of the fleet vehicle is not known to the monitoring device, measurement requests may generally be communicated. In this case, the fleet vehicle may independently decide to what extent it may meet the measurement requirements. Criteria for this could include, for example, the energy consumption for the route, the travel time for the route, the quality of the connectivity (mobile communications), the passing of tourist destinations. For each criterion, for example, a suitable threshold value (for example additional energy consumption below a defined threshold) or a yes-no decision (passing a tourist destination or not) could be defined. If the route is planned differently or changed, this may be rejected by the driver, which is why he may be given a corresponding possibility of interacting with the monitoring device. To do this, the driver must be told why the new route should be taken. It is also possible to offer the driver a reward system for generating as many update messages as possible. This may be either a virtual or real currency. Fleet operators such as taxi or minibus companies are a particularly interesting target group for this. On the one hand, measurement requests may be sent from the backend to non-commercial vehicles. On the other hand, it is also conceivable that contracts will be concluded with companies (especially fleet operators) in order to have targeted measurement jobs carried out by commercial vehicles. This means that data protection is also clearly regulated. One such example of a commercial commissioning is driverless automatic vehicles (e.g. robotic taxis). If these vehicles are on the road without passengers and without time pressure (e.g. looking for a parking space), the measurement requests may lead directly to detours. With this new type of use, fleet operators may generate added value that they would otherwise not have in the unused time.

Furthermore, it may in some embodiments be provided that the monitoring device takes into account the quality of map sections when transmitting targeted measurement requests, the quality of the map sections including the age, the accuracy and/or the uncertainty of the map sections. Thus map sections may be updated which require this. An update of freshly updated map sections may thus be avoided. Hence, the available resources may be used in a targeted manner and costs may be saved.

Furthermore, it may in some embodiments be provided that the quality of the sensors includes at least one information, such as:
a) type of sensors,
b) position of the sensors on the fleet vehicle,
c) alignment of the sensors,
d) resolution of the sensors,
e) calibration of the sensors,
f) software support, hardware support, connectivity of the sensors on the fleet vehicle, and/or
g) suitability of the sensors to detect certain measurement requests of the monitoring device.

Regarding the type of sensors in point a), the following types of sensors may be considered:

1. Laser sensors that have a potentially long range and are suitable for capturing geometric information. Possible measurement jobs for laser sensors may comprise positions and/or dimensions of specific objects on the map, specific open spaces and/or drivable areas.

2. Stereo cameras, so-called time-of-flight cameras, may deliver similarly good results when capturing geometric information as laser sensors.

3. Cameras in general are well suited for classifying objects and determining color information. Possible measurement jobs may include determining colors of the lane markings, determining speed limits on traffic signs or the like.

4. (Flash) lidar sensors may be beneficial to capture a 3D image.

5. Radar devices measure speeds of objects in a beneficial manner. Possible measurement jobs include determining traffic density in a certain area, determining radar localization features or the like.

6. Ultrasonic sensors are well suited for distance measurements at close range. Possible measurement jobs may include determining geometries or the presence of parking spaces; determining widths, for example in a narrow alley, or the like.

7. Capacitive sensors may also be well suited to carry out distance measurements at close range and/or to record the road conditions.

8. Virtual sensors (for example car-to-car) may be beneficial in order to record the number of road users or the like.

9. GPS sensors provide determining reception quality on lanes in order to improve localization quality.

10. Rain or light sensors may determine the amount of precipitation and the position of the sun.

11. Radio modems may improve connectivity measurements. This allows data to be downloaded from the Internet in advance.

12. Sensors for determining the coefficient of friction may be useful for optimizing the driving and braking behavior of the fleet vehicle.

Regarding point b), the position of the sensors on the fleet vehicle (top, front, rear) may be taken into account, which may be important for distance measurements at close range.

Regarding point c) the alignment of the sensors may be taken into account. It is thus possible to check whether a certain measuring job may be carried out by the sensor at all and/or whether the object to be measured will be in the field of view long enough during the movement.

Regarding point d) the resolution of the sensors may be taken into account. It may thus be checked whether, for example, the resolution of a camera is good enough to be able to interpret a traffic sign.

Regarding point e) the calibration of the sensors may be taken into account. It may thus be determined, for example, if the sensor set on the fleet vehicle is sufficiently calibrated in order to be able to carry out measurement jobs requiring geometric accuracy with a high quality.

Regarding point f) the software support of the sensors on the fleet vehicle may be taken into account. It may thus be verified whether, for example, image processing is available in order to be able to interpret traffic signs.

The hardware support may also be relevant in determining if the fleet vehicle has enough computing resources to be able to carry out the measurement.

Furthermore, the connectivity may be important in order to determine if the vehicle may establish a connection to the monitoring device in the near future in order to be able to send the result of the measurement carried out.

Regarding point g), the suitability of the sensors of detecting certain measurement requests from the monitoring device may generally be taken into account. The suitability of the sensors may be checked based on the following criteria: age of the map sections, accuracy of the map sections and/or uncertainty of the map sections (for example a sign is known, but which sign it is, is unknown).

Furthermore, in some embodiments it may be provided that when transmitting targeted measurement requests the monitoring device takes into account sensor groups and/or sensor combinations with which the individual fleet vehicles are equipped. For that matter traffic information is conceivable that cannot or cannot completely be detected by one type of sensor. For this, different types of sensors may beneficially be used. For example, when detecting the position and the content and, as the case may be, the inscription of a sign, a combination of sensors as a lidar sensor and a camera may be beneficial.

According to the present exemplary aspect, it is provided that the monitoring device queries the traffic information from the fleet vehicles, which may process the sensor data locally into traffic information. The load on the monitoring device may thus be relieved. The number of data that must be exchanged between the fleet vehicle and the monitoring device may thus also be limited.

In addition and in some embodiments, it may be provided that the monitoring device periodically updates the measurement requests and/or takes into account inquiries from the fleet vehicles when creating the measurement requests. A regulated and/or demand-oriented updating of the traffic information may thus be made possible.

In some embodiments, the communication between the monitoring device and the fleet vehicles is carried out via a mobile communication link, sound waves, radio waves, electromagnetic waves and/or the Internet. This way, suitable communication may be set up between the monitoring device and the individual fleet vehicles, which communication may be selected depending on the data volume, the data type and/or other important parameters for traffic monitoring.

Another exemplary aspect provides a system for determining traffic information, which is designed with a central monitoring device that is in communication with a plurality of fleet vehicles in order to receive traffic information from the fleet vehicles, wherein the monitoring device communicates with the fleet vehicles by transmitting targeted measurement requests to the fleet vehicles. For this purpose, the monitoring device is designed to carry out the method which has been described in the preceding. With the aid of the system according to the present aspect, the same benefits are achieved that were described above in connection with the method according to the preceding aspect. To avoid repetition, reference is made thereon in its entirety.

Furthermore and in some embodiments, the monitoring device comprises a memory device in which the traffic information, measurement requests, map sections, information about the quality of different map sections, information about the quality of different sensors are stored. The map, together with all information and updates, may thus be stored centrally in the monitoring device.

Furthermore and in some embodiments, the monitoring device comprises a control device that is designed to create targeted measurement requests for the fleet vehicles, and/or that the control device is designed to evaluate the quality of sensors with which the individual fleet vehicles are equipped and/or that the control device is designed to evaluate the quality of map sections that are stored in the storage device, and/or that the control device is designed to process traffic information. The method according to the present aspect with all its variations may thus be carried out at a central point.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described.

In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The FIGURE shows a system 100 for determining traffic information, which comprises a central monitoring device 10 which is in communication with a plurality of fleet vehicles 101 in order to receive traffic information from the fleet vehicles 101. The monitoring device 10 is designed to transmit targeted measurement requests to the fleet vehicles 101 when communicating with the fleet vehicles 101.

First of all, the monitoring device 10 is fed with initial map data which are stored in a storage device 11, for example.

Furthermore, a control device 12 may decide if certain map sections need to be updated. Here, the control device 12 may take into account the age, the accuracy and/or the uncertainty of the map sections.

According to the present embodiment, it is provided that the monitoring device 10 takes into account the quality of sensors with which the individual fleet vehicles 101 are equipped when transmitting targeted measurement requests for updating certain map sections.

The quality of the sensors within the meaning of the present discussion includes at least one information about:
a) type of sensors,
b) position of the sensors on the fleet vehicle 101,
c) alignment of the sensors,
d) resolution of the sensors,
e) calibration of the sensors,
f) software support, hardware support, connectivity of the sensors on the fleet vehicle 101, and/or
g) suitability of the sensors to detect certain measurement requests of the monitoring device 10.

Furthermore, when transmitting targeted measurement requests the monitoring device 10 may take into account several sensors in a group and/or combinations with which the individual fleet vehicles 101 are equipped.

The monitoring device 10 may receive the traffic information in the form of sensor data and process this centrally in the control device 12.

It is also conceivable that the fleet vehicles 101 may provide traffic information that has already been processed, for example changed map sections, to the monitoring device 10.

The monitoring device 10 may query the fleet vehicles 101 periodically. In addition, the fleet vehicles 101 may independently transmit certain map sections that are relevant from the point of view of the vehicles to the monitoring device 10.

The communication between the monitoring device 10 and the fleet vehicles 101 may be carried out via a mobile communication connection 102, sound waves, radio waves, electromagnetic waves and/or the Internet.

As soon as the traffic information within the monitoring device 10 is updated, the monitoring device 10 may send this updated traffic information to all fleet vehicles 101.

The above description of the FIGURE refers to exemplary embodiments. Of course, individual features of the embodiments may be freely combined with one another without departing from the scope of the present discussion, insofar as it is technically sensible.

LIST OF REFERENCE NUMERALS

100 System
101 Fleet vehicles
102 Communication connection
10 Monitoring device
11 Storage device
12 Control device The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining traffic information, using a central monitoring device which is in communication with a plurality of fleet vehicles in order to receive traffic information from the fleet vehicles, the monitoring device being remote to the plurality of fleet vehicles, comprising:
   transmitting, within the communication with the fleet vehicles, by the monitoring device targeted measurement requests to the fleet vehicles, which targeted measurement requests comprise georeferenced data that refers to map elements to be updated;
   wherein within the transmission of targeted measurement requests the monitoring device takes into account the quality of sensors with which the individual fleet vehicles are equipped; and
   requesting, by the monitoring device, the traffic information from the fleet vehicles, which locally can process the sensor data into traffic information.

2. The method of claim 1,
   wherein within transmitting targeted measurement requests the monitoring device takes into account the quality of map sections,
   wherein the quality of the map sections comprises one or more of the age, the accuracy, and the uncertainty of the map sections.

3. The method of claim 1, wherein the quality of the sensors includes at least one information of the group of information of:
   a) type of sensors,
   b) position of the sensors on the fleet vehicle,
   c) alignment of the sensors,
   d) resolution of the sensors,
   e) calibration of the sensors,
   f) software support, hardware support, connectivity of the sensors on the fleet vehicle, and
   g) suitability of the sensors to detect certain measurement requests from the monitoring device.

4. The method of claim 1, wherein within transmitting targeted measurement requests the monitoring device takes into account sensor groups and / or sensor combinations with which the individual fleet vehicles are equipped.

5. The method of claim 1, wherein the monitoring device periodically updates the measurement requests and / or takes into account inquiries from the fleet vehicles within creating the measurement requests.

6. The method of claim 1, wherein the communication between the monitoring device and the fleet vehicles is carried out via one or more of a mobile communication connection, sound waves, radio waves, electromagnetic waves, and the Internet.

7. A system for determining traffic information, with a central monitoring device which is in communication with a plurality of fleet vehicles in order to receive traffic information from the fleet vehicles,
   wherein within communicating with the fleet vehicles the monitoring device transmits targeted measurement requests to the fleet vehicles, which targeted measurement requests comprise georeferenced data that refers to map elements to be updated,
   wherein the monitoring device is designed to carry out the method according to claim 1.

8. The system of claim 7, wherein the monitoring device comprises a memory device in which one or more of the traffic information, measurement requests, map sections, information about the quality of different map sections, and information about the quality of different sensors are stored.

9. The system of claim 7, wherein the monitoring device comprises a control device which is configured for one or more of creating to create targeted measurement requests to the fleet vehicles, and evaluating the quality of sensors with which the individual fleet vehicles are equipped.

10. The method of claim 2, wherein the quality of the sensors includes at least one information of the group of information of:
    a) type of sensors,
    b) position of the sensors on the fleet vehicle,
    c) alignment of the sensors,
    d) resolution of the sensors,
    e) calibration of the sensors,
    f) software support, hardware support, connectivity of the sensors on the fleet vehicle, and
    g) suitability of the sensors to detect certain measurement requests from the monitoring device.

11. The method of claim 2, wherein within transmitting targeted measurement requests the monitoring device takes into account sensor groups and / or sensor combinations with which the individual fleet vehicles are equipped.

12. The method of claim 3, wherein within transmitting targeted measurement requests the monitoring device takes into account sensor groups and / or sensor combinations with which the individual fleet vehicles are equipped.

13. The method of claim 2, wherein the communication between the monitoring device and the fleet vehicles is carried out via one or more of a mobile communication connection, sound waves, radio waves, electromagnetic waves, and the Internet.

14. The method of claim 3, wherein the communication between the monitoring device and the fleet vehicles is carried out via one or more of a mobile communication connection, sound waves, radio waves, electromagnetic waves, and the Internet.

15. The method of claim 4, wherein the communication between the monitoring device and the fleet vehicles is carried out via one or more of a mobile communication connection, sound waves, radio waves, electromagnetic waves, and the Internet.

16. The method of claim 5, wherein the communication between the monitoring device and the fleet vehicles is carried out via one or more of a mobile communication connection, sound waves, radio waves, electromagnetic waves, and the Internet.

17. The system of claim 8, wherein the monitoring device comprises a control device which is configured for one or more of creating targeted measurement requests to the fleet vehicles, and evaluating the quality of sensors with which the individual fleet vehicles are equipped.

18. The system of claim 7, wherein the monitoring device comprises a control device which is configured for one or more of evaluating the quality of map sections that are stored in the storage device, and processing traffic information.

19. The system of claim 8, wherein the monitoring device comprises a control device which is configured for one or more of evaluating the quality of map sections that are stored in the storage device, and processing traffic information.

* * * * *